United States Patent
Nomura et al.

(10) Patent No.: US 6,781,630 B2
(45) Date of Patent: Aug. 24, 2004

(54) ADAPTER SYSTEM AND IMAGE PICK-UP SYSTEM

(75) Inventors: Masaru Nomura, Tokyo (JP); Takashi Yoshimine, 5-3-107 Minami-cho, Toda-shi, Saitama-Ken 335-0025 (JP)

(73) Assignee: Takashi Yoshimine, Saitama-ken (JP)

( * ) Notice: Subject to any disclaimer, the term of this patent is extended or adjusted under 35 U.S.C. 154(b) by 530 days.

(21) Appl. No.: 09/859,234

(22) Filed: May 17, 2001

(65) Prior Publication Data

US 2002/0012045 A1 Jan. 31, 2002

Related U.S. Application Data

(63) Continuation-in-part of application No. 09/591,717, filed on Jun. 12, 2000.

(30) Foreign Application Priority Data

Jul. 26, 1999 (JP) .......................................... 11-241976

(51) Int. Cl.[7] .............................................. H04N 5/225
(52) U.S. Cl. ........................... 348/335; 348/75; 348/79; 348/360; 359/368; 359/819
(58) Field of Search ........................... 348/75, 79, 335, 348/357, 360; 359/827, 819, 368, 828

(56) References Cited

U.S. PATENT DOCUMENTS

| | | | | |
|---|---|---|---|---|
| 5,215,095 A | * | 6/1993 | Macvicar et al. | 600/425 |
| 6,147,797 A | * | 11/2000 | Lee | 359/363 |
| 2001/0048549 A1 | * | 12/2001 | Wang | 359/363 |

FOREIGN PATENT DOCUMENTS

JP    U3068547    5/2000

OTHER PUBLICATIONS

Ackland, Bryan and Dickinson, Alex; "Camera on a Chip"; IEEE 1996.*

* cited by examiner

Primary Examiner—Ngoc-Yen Vu
Assistant Examiner—Heather R. Long
(74) Attorney, Agent, or Firm—Rader, Fishman & Grauer PLLC

(57) ABSTRACT

When a digital camera is used on the side of a C-mount section of a microscope, the digital camera is attached to the C-mount section of the microscope with a C-mount adapter and an optical adapter between them. When the digital camera is used on the side of an ocular section of the microscope, the digital camera is attached to the ocular section of the microscope with the optical adapter between them.

12 Claims, 14 Drawing Sheets

ADAPTER SYSTEM AND IMAGE PICK-UP SYSTEM

CROSS-REFERENCE TO RELATED APPLICATIONS

This is a Continuation-in-Part application of U.S. patent application Ser. No. 09/591,717, filed Jun. 12, 2000, the entire contents of which are incorporated herein as follows.

BACKGROUND OF THE INVENTION

1. Field of the Invention

The present invention relates to an adapter system and an image pick-up system for applying, for example, a digital camera to a microscope.

2. Description of the Related Art

The recent widespread use of digital cameras is remarkable, and the digital camera is by no means inferior to conventional silver cameras in terms of functions, price, and the like. Hitherto, a magnified image has been picked up by attaching such a digital camera to a microscope, in which case the digital camera is attached to a C-mount section provided at a position different from that of an ocular section of the microscope.

The microscope having the C-mount section, however, is very special and expensive. Hence, in spite of the recent situation in which digital cameras have come into wide use, it is extremely difficult to obtain a magnified image through the microscope as a digital image.

SUMMARY OF THE INVENTION

An object of the present invention is to provide an adapter system and an image pick-up system capable of easily picking up a magnified image through a microscope by using an image pick-up apparatus such as a digital camera or the like.

To settle the aforesaid problems, a main aspect of the present invention is an adapter system, comprising: (a) a first adapter including: a main body, a first end of which is inserted into an ocular inserting portion of a microscope and held engagingly in a predetermined position and to the second end of which an image pickup apparatus is allowed to be attached, having a first optical path therein; and a first lens system which is disposed in the first optical path inside the main body and which allows an image through the ocular inserting portion to be formed at a specified position of the image pick-up apparatus attached to the main body while the main body is inserted into the ocular inserting portion of the microscope and held engagingly in the predetermined position; and (b) a second adapter, a first end of which is engaged with a C-mount section of the microscope and into the second end of which the first end of the first adapter is inserted and held engagingly in a predetermined position, having therein a second optical path with a second optical path length which allows an image to be formed through the C-mount section of the microscope at the specified position of the image pick-up apparatus attached to the first adapter while the first end of the first adapter is inserted into the second end and locked in the predetermined position.

According to the present invention, the image pick-up apparatus such as the digital camera or the like can be attached not only to the C-mount section of the microscope, but also to the ocular section side of the microscope, whereby the magnified image through the microscope can be easily picked up by using the image pick-up apparatus such as the digital camera or the like. Furthermore, a state in which the image pick-up apparatus such as the digital camera or the like is attached to the C-mount section of the microscope and a state in which an ocular is attached to the ocular section of the microscope are optically conditioned identically, and thus an image seen under the microscope through the ocular and an image picked up by the image pick-up apparatus accord optically. Accordingly, it becomes possible to pick up an image by the use of the image pick-up apparatus while looking at the image under the microscope through the ocular.

The present invention further comprising: (a) a first adaptor including: a first end of which is inserted into a first ocular inserting portion of a first inside diameter of a microscope and held engagingly in a predetermined position, and to a second end of which an image pick-up apparatus is allowed to be attached, having an optical path therein; and a lens system which is disposed in the optical path inside the main body and which allows an image through the first ocular inserting portion to be formed at a specified position of the image pick-up apparatus attached to the main body, while the main body is inserted to the first ocular inserting portion of the microscope, and is held engagingly in a predetermined position; (b) a second adaptor, the first end of the main body is inserted to and held engagingly in a predetermined position and is further inserted to the second ocular inserting portion of a microscope having the second inside diameter bigger than the first thereof, and is held engagingly in a predetermined position, (c) a rotation stopping portion provided on a contact portion of the first adaptor and the second adaptor which prevents rotation of the main body, while first end of the main body is inserted to the second adaptor, and the second adaptor is inserted to a second ocular inserting portion.

According to this configuration, the image pick-up apparatus such as the digital camera or the like can be attached to the ocular section side of the microscope, whereby magnified image through the microscope can be easily picked up by using the image pick-up apparatus. In addition, a contact portion wherein a main body of the adaptor contacts with an ocular inserting portion of the microscope, is comprised of the rotation stopping portion to prevent rotation of the main body inserted to an ocular inserting portion of the microscope therefore rotation of an image pick-up apparatus attached to a first end of the main body caused by gravity can be prevented.

Furthermore, the system further comprising; a fourth adapter, having a first end and a second end, the first end being inserted to the second end of the main body, and a third lens system being disposed in a third optical path inside the fourth adapter; wherein the main body allows the fourth adapter to be inserted to the second end thereof; and, wherein the fourth adapter is held engagingly in a predetermined position when the first end thereof is inserted to the second end of the main body, a CCD camera is allowed to be attached to the second end thereof, and the third lens system allows an image to be formed at a specified position of the CCD camera through the ocular inserting portion and the first adapter of the microscope, when the first end of the fourth adapter is inserted to the second end of the main body and held engagingly in the predetermined position, in the same time, the first end of the main body is inserted to the ocular inserting portion of the microscope and held engagingly in the predetermined position.

According to the present invention, a CCD camera can easily be attached, for example, to an ocular inserting portion of a microscope without C-mount section, and it becomes possible to pick up an image by using the CCD camera.

These objects and still other objects and advantages of the present invention will become apparent upon reading the following specification when taken in conjunction with the accompanying drawings.

DETAILED DESCRIPTION OF THE PREFERRED EMBODIMENT

Preferred embodiments of the present invention will be described below based on the drawings.

Figure 1:
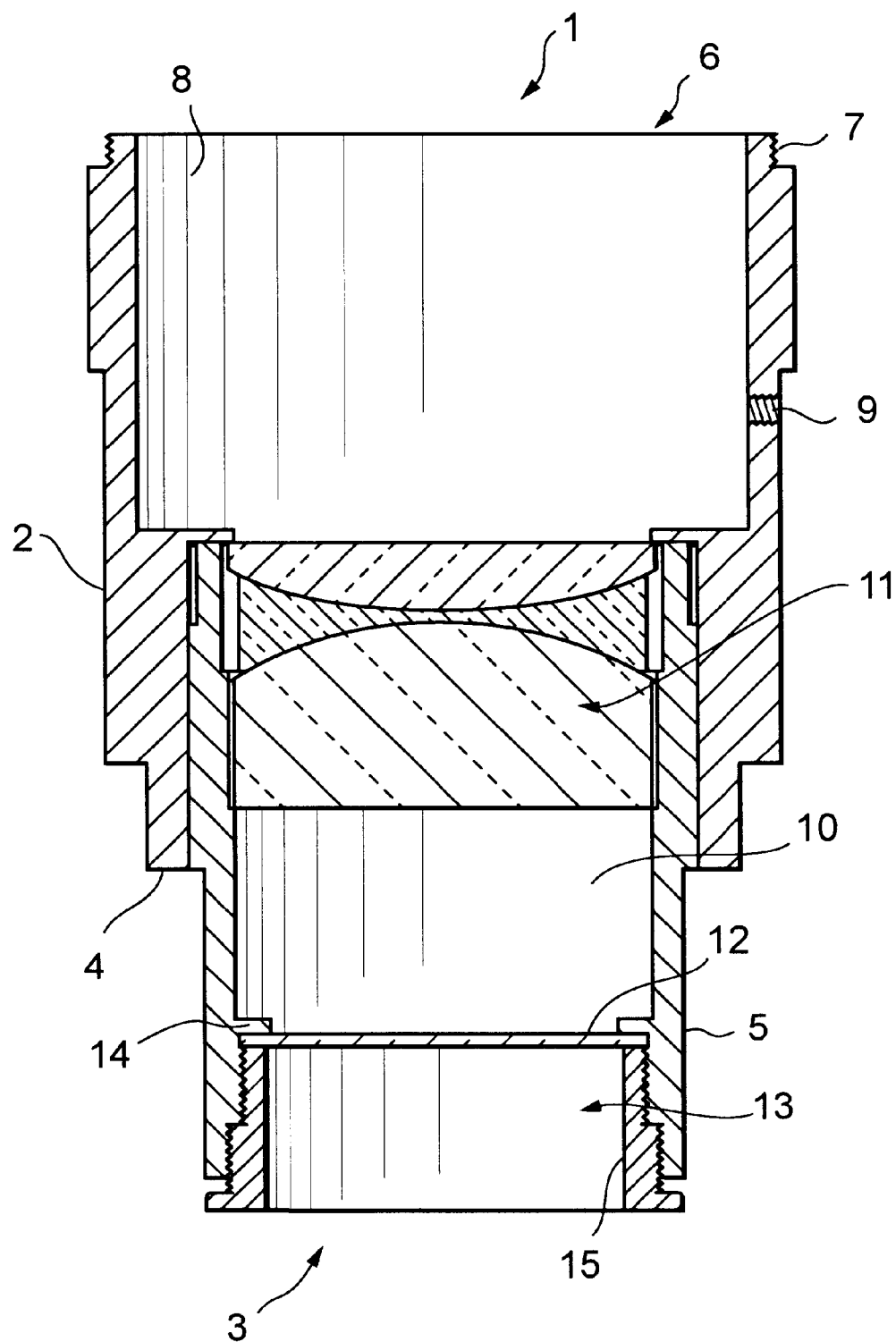
FIG. 1 is a sectional view showing the structure of an optical adapter in an adapter system according to an embodiment of the present invention.
Figure 2:
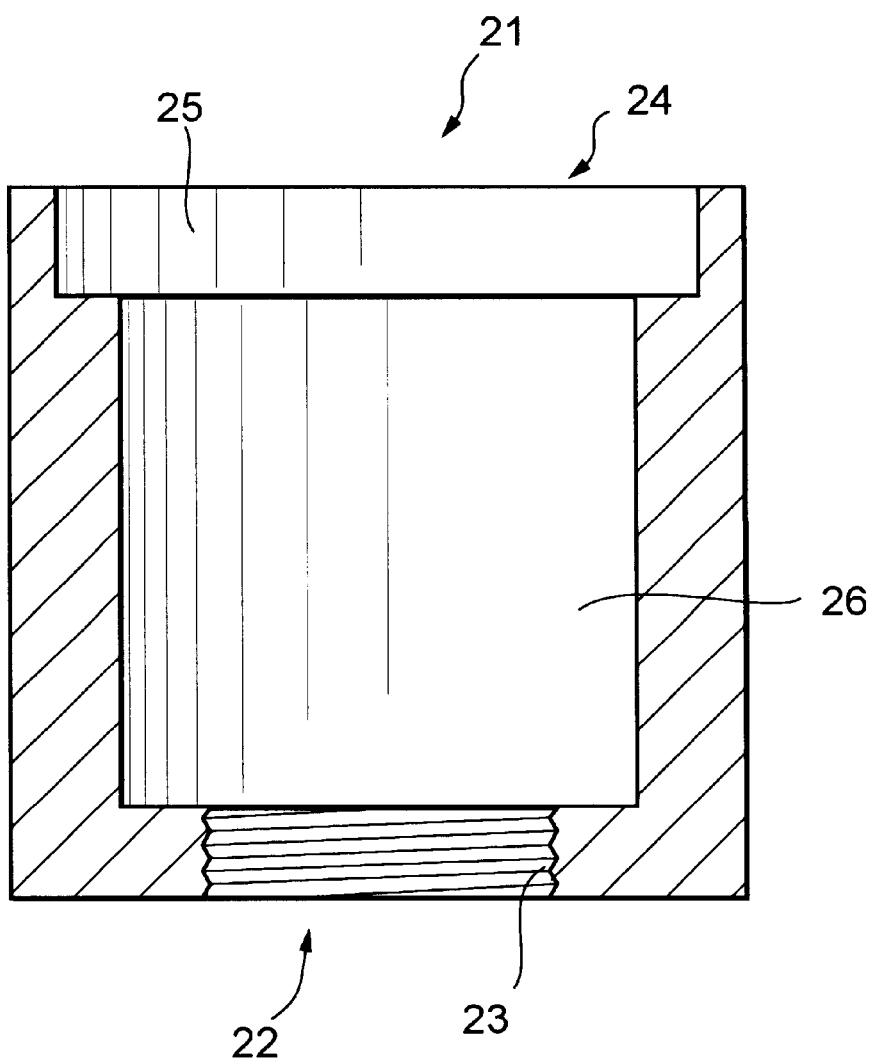
FIG. 2 is a sectional view showing the structure of a C-mount adapter in the adapter system according to the embodiment of the present invention.

FIG. 1 and FIG. 2 are sectional views showing the structure of an adapter system according to an embodiment of the present invention, FIG. 1 shows an optical adapter as a first adapter, and FIG. 2 shows a C-mount adapter as a second adapter.

As shown in FIG. 1, a main body 2 of an optical adapter 1 has a stepped cylindrical shape. A first end 3 of the main body 2 is inserted into an ocular inserting portion of a microscope, and an engaging portion 4 having a diameter slightly larger than that of the first end 3 is held engagingly at an inlet of the ocular inserting portion, whereby the first end 3 of the main body 2 is inserted into the ocular inserting portion of the microscope and held engagingly in a predetermined position. The surface of a contact portion 5, which is an outer peripheral portion of the main body 2 and comes in contact with the ocular inserting portion of the microscope, is made rougher than the surfaces of other portions to function as a rotation stopping portion for preventing the rotation of the optical adapter inserted into the ocular inserting portion of the microscope. In the present invention, a digital camera, for example, is inserted into the ocular inserting portion of the microscope with the optical adapter 1 between them, in which case the digital camera is prone to rotate unexpectedly since the digital camera and the optical adapter are mounted in an oblique direction as will be described later. The provision of the aforesaid rotation stopping portion can prevent such rotation by simple structure.

The digital camera or a CCD camera as an image pick-up apparatus can be attached to a second end 6 of the main body 2. A screwing portion 7 at which a lens section of the digital camera is screwed down is provided at an outer peripheral portion of the second end 6 of the main body 2. A clearance is provided at the end of a screw thread of the screwing portion 7, and thereby the attached digital camera can easily be detached. Moreover, an insertion portion 8 into which a lens section of the CCD camera is inserted is provided in an inner peripheral portion of the second end 6 of the main body 2. The digital camera and the CCD camera are set to have such optical path lengths those optical images from the microscope accord when they are attached to the microscope with the optical adapter 1 between them. A threaded hole 9 in which a screw for fixing the CCD camera inserted into the insertion portion 8 is driven is provided in the main body 2. The CCD camera is commonly wired from a personal computer or the like, but fixing of the CCD camera with a screw through the threaded hole 9 can prevent the CCD camera from rotating unexpectedly by being pulled by wires or the like.

An optical path 10 for letting an optical image from the microscope pass is provided inside the main body 2. Provided in the optical path 10 of the main body 2 is a lens system 11 which allows a image through the ocular inserting portion of the microscope to be formed at a specific position of the digital camera or the CCD camera attached to the main body 2 while the main body 2 is inserted into the ocular inserting portion of the microscope and held engagingly in the predetermined position.

A dimension measuring glass mounting portion 13 to/from which a dimension measuring glass 12 can be attached and detached is provided at a focal position in the optical path 10 in the main body 2. The dimension measuring glass mounting portion 13 is structured so that the dimension measuring glass 12 is inserted from the first end 3 side of the main body 2, fixed at a protruding portion 14 provided on the inner wall on the first end 3 side of the main body 2, and sandwiched between a ring member 15 screwed to the inner periphery on the first end 3 side of the main body 2 and the protruding portion 14. In the optical adapter according to the present invention, the aforesaid dimension measuring glass mounting section 13 can be provided specially in the optical path 10, whereby it becomes possible that various images such as a dimension line and the like are superimposed on an image via the microscope by providing the dimension measuring glass mounting portion 13 structured as above to/from which the dimension measuring glass 12 is attachable and detachable.

As shown in FIG. 2, a C-mount adapter 21 has a cylindrical shape. A screw portion 23 for locking into, that is, screwing to a C-mount section of the microscope is provided at a first end 22 of the C-mount adapter 21, and an insertion portion 25 into which the first end 3 of the optical adapter 1 shown in FIG. 1 is inserted and held engagingly in the predetermined position is provided at a second end 24 thereof. An optical path 26 having an optical length which allows an image to be formed at the aforesaid specific position of the digital camera or the CCD camera attached to the optical adapter 1 through the C-mount section of the microscope is provided inside the C-mount adapter 21 while the first end 3 of the optical adapter 1 is inserted into the insertion portion 25 at the second end 24 and held engagingly in the predetermined position.

The adapter system according to the embodiment of the present invention is structured as above, and can be used, for example, as follows.

Figure 3:
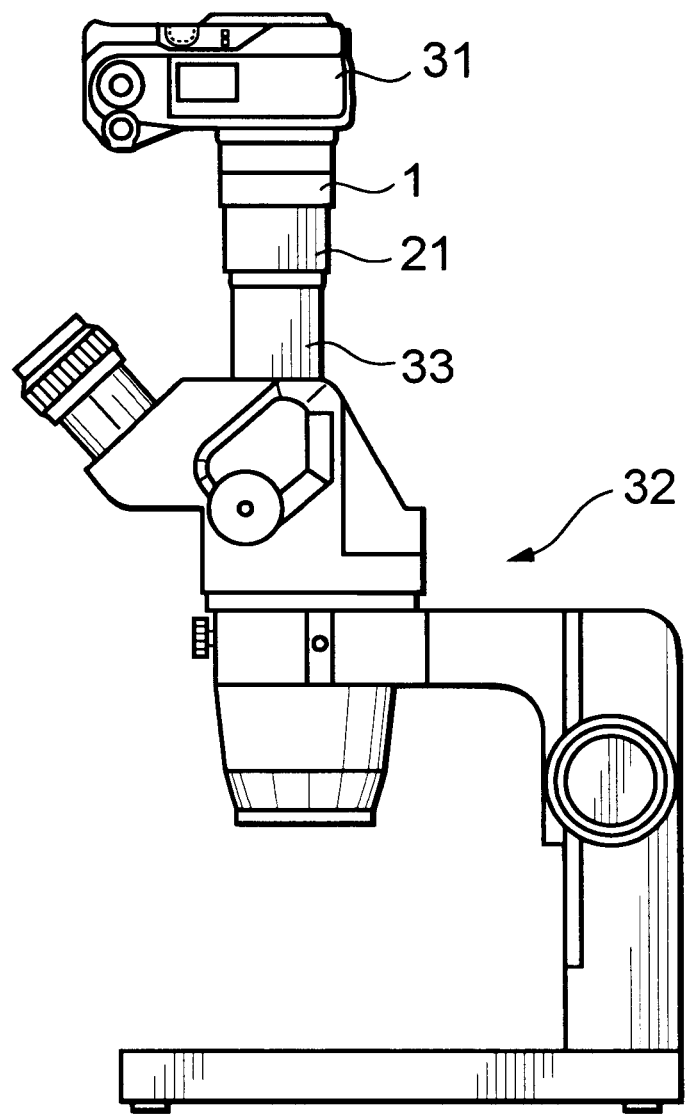
FIG. 3 is a diagram for explaining an example (a first example) of the use of the adapter system according to the embodiment of the present invention.

When a digital camera 31 is used on the side of a C-mount section 33 of a microscope 32, for example, as shown in FIG. 3, the digital camera 31 is attached to the C-mount section 33 of the microscope 32 with the C-mount adapter 21 and the optical adapter 1 between them. The case of the CCD camera is also the same as above. In these cases, a user can confirm an image optically identical with an image picked up by the digital camera 31 from an ocular section 34 of the microscope 32.

Figure 4:
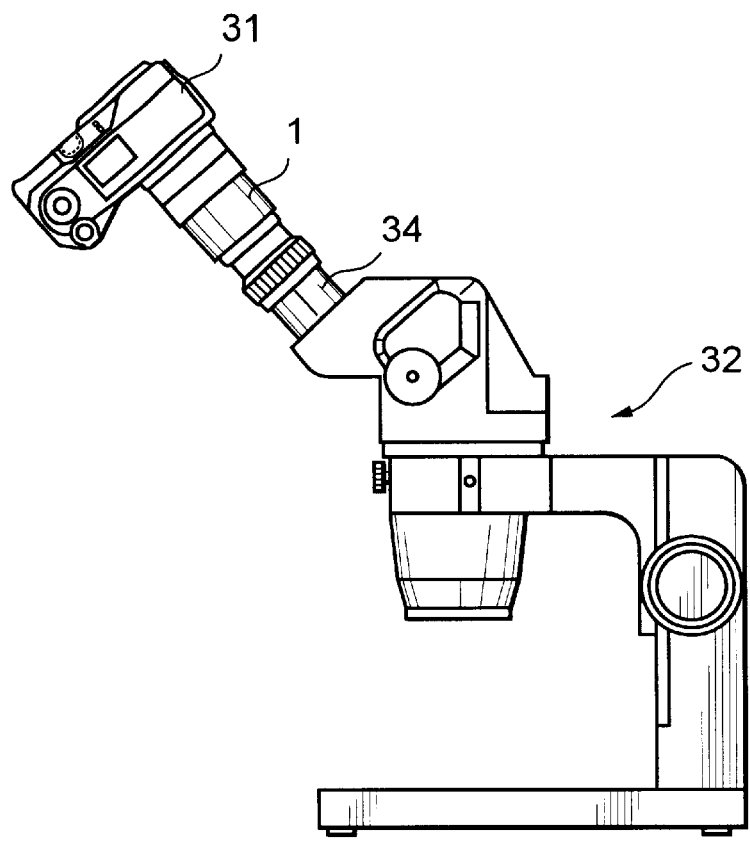
FIG. 4 is a diagram for explaining an example (a second example) of the use of the adapter system according to the embodiment of the present invention.

When the digital camera 31 is used on the ocular section 34 side of the microscope 32 as shown in FIG. 4, the digital camera 31 is attached to the ocular section 34 of the microscope 32 with the optical adapter 1 between them. The case of the CCD camera is also the same as above. Thus, the digital camera can be used also for a common microscope with no C-mount section.

Figure 5:
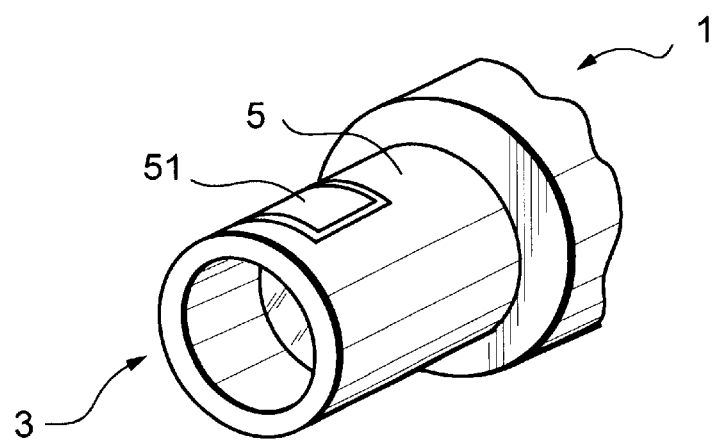
FIG. 5 is a diagram showing another example of a rotation stopping portion according to the present invention.

It should be mentioned that the aforesaid rotation stopping portion may be structured so that a tape 51 is stuck on the contact portion 5 which is the outer peripheral portion of the main body 2 of the optical adapter 1 and comes in contact with the ocular inserting portion of the microscope as shown in FIG. 5. It is more effective to stick the tape 51 on the upper side of the contact portion 5.

Figure 6:
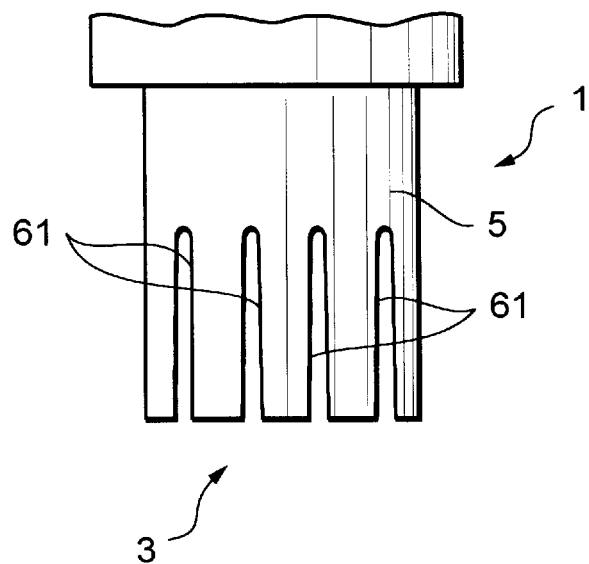
FIG. 6 is a diagram showing still another example of the rotation stopping portion according to the present invention.

Moreover, the rotation stopping portion may be a plurality of slots 61 which are formed in the contact section 5 of the main body 2 of the optical adapter 1 in the direction of insertion into the ocular inserting portion of the microscope as shown in FIG. 6. The formation of these slots 61 makes it possible to give elastic force to the ocular inserting portion side of the microscope, thereby producing effect on prevention of rotation.

Figure 7:
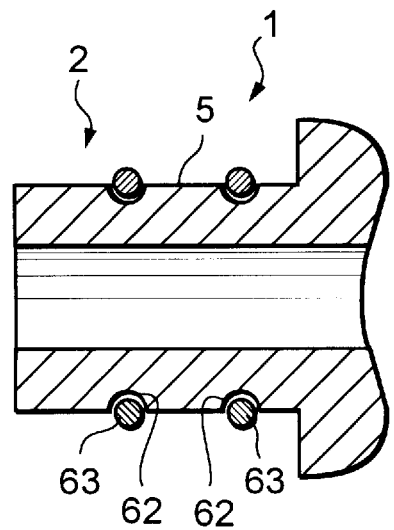
FIG. 7 is a diagram showing yet another example of the rotation stopping portion according to the present invention.

Furthermore, as shown in FIG. 7, the rotation stopping portion may be structured so that two grooves 62 are provided along the circumference of the contact portion 5 of the main body 2 of the optical adapter 1 and that O-rings 63 are fitted respectively in these grooves.

Next, another embodiment of the present invention will be explained.

Figure 8:
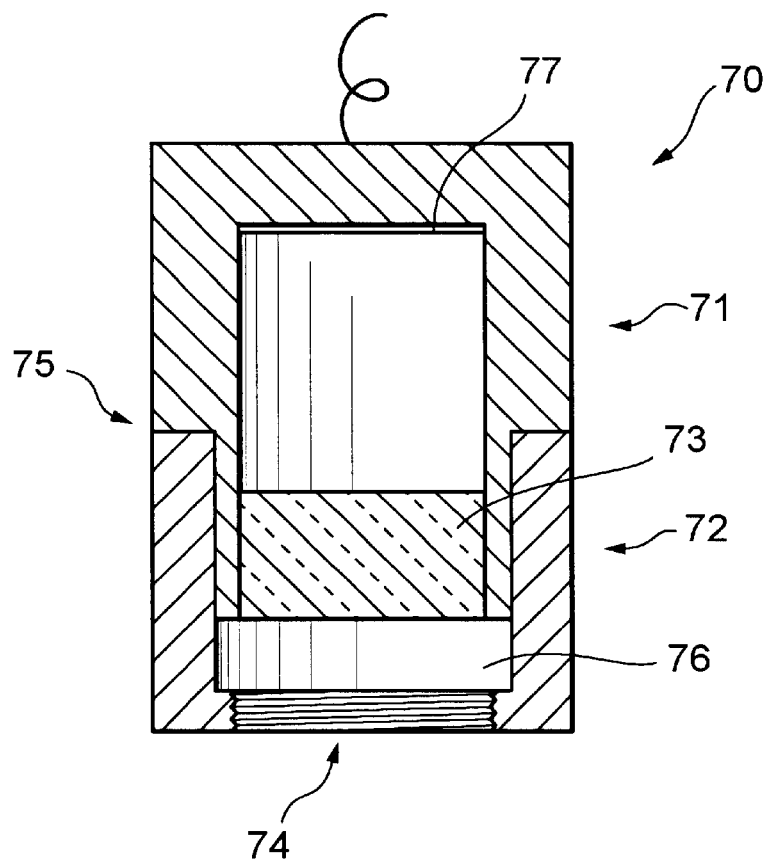
FIG. 8 is a sectional view showing the structure of an image pick-up system according to another embodiment of the present invention.

As shown in FIG. 8, an image pick-up system 70 according to this embodiment is composed of a CMOS camera 71 and an adapter 72.

In the CMOS camera 71, a CMOS sensor 77 is placed at a position where an image through the ocular inserting portion of the microscope is formed while the CMOS camera 71 is inserted into the ocular inserting portion of the microscope and held engagingly in a predetermined position. Incidentally, the numeral 73 denotes a lens system.

In the adapter 72, a first end 74 thereof is engaged with the C-mount section of the microscope, and the CMOS camera 71 is inserted into a second end 75 thereof and held engagingly in a predetermined position, and provided therein is an optical path 76 with an optical path length which allows an image to be formed through the C-mount section of the microscope on the CMOS sensor 77 placed in the CMOS camera 71 while the CMOS camera 71 is inserted into the second end 75 and held engagingly in the predetermined position.

In the image pick-up system according to the present invention, the CMOS camera 71 can be used at both the C-mount section and the ocular section of the microscope.

Figure 9:
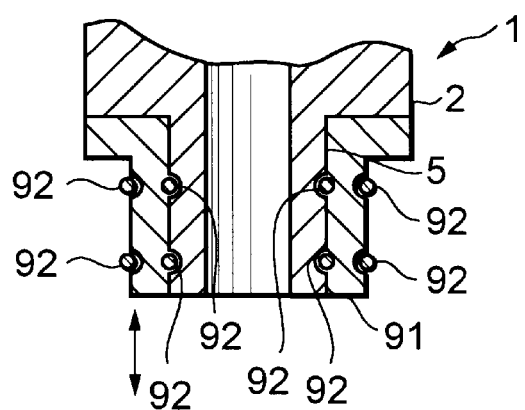
FIG. 9 is a sectional view for explaining a modified example of the present invention.

It should be mentioned that the inside diameter of the ocular inserting portion of the microscope has two standards: φ23.2 and φ30. Thus, as shown in FIG. 9, the outside diameter of the contact portion 5 of the main body 2 of the optical adapter 1 is φ23.2, and an adapter 91 with an outside diameter of φ30 is allowed to be attached to the outer periphery of the contact portion 5, which makes it possible to cope with the both standards. In this case, it is more preferable in terms of the aforesaid prevention of rotation to put O-rings 92 into each of the outer peripheries, for example, in two places. The adapter 91 is also applicable to the CMOS camera shown in FIG. 8.

Figure 10:
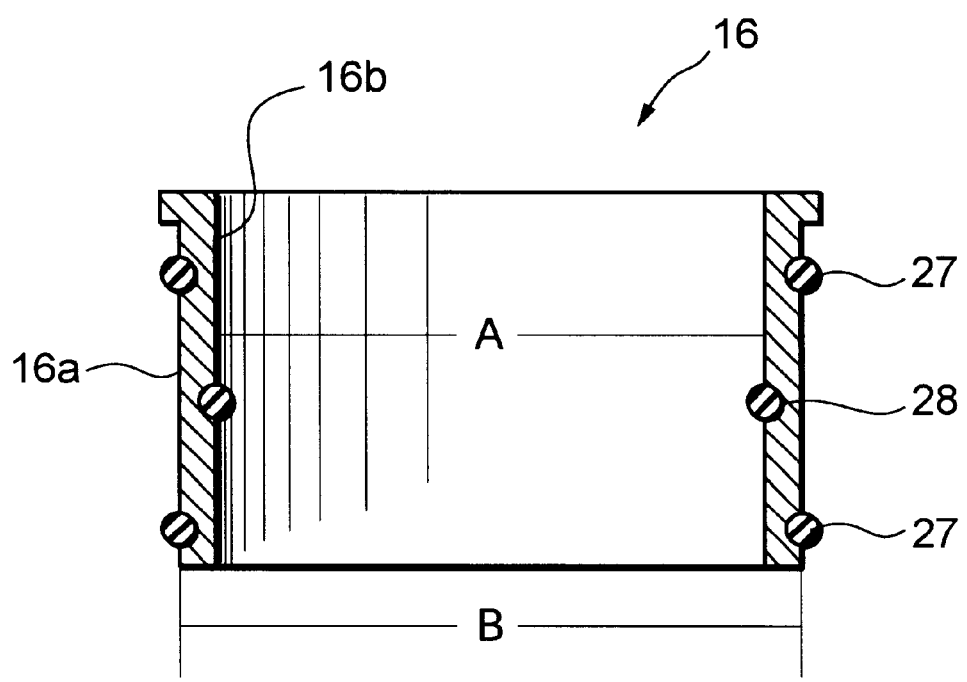
FIG. 10 is a sectional view showing the configuration of φ30 adaptor in adaptor system according to the embodiment of the present invention.

Next, as referred in FIG. 10, one O-ring 28 is attached to the inner periphery side 16b as a rotation stopping portion of the second cylindrical adaptor 16, and two O-rings 27 are attached to the outer periphery side 16a. Outside diameter A of this second adaptor 16 is the same size as an ocular inserting portion of 30 diameter microscope established by Japanese Industrial Standard. In addition, first end 3 of a main body 2 of optical adapter 1 is inserted to the second adaptor 16, so that it is fixed in a predetermined position. In other words, as shown in FIG. 11, contact portion 5 of the first end 3 of the main body 2 is fit to contact with inner periphery side 16b, while the optical adapter 1 and the second adaptor is fit together as thus described, outer periphery side 16a of the second adaptor 16 is fit as such to fit with ocular inserting portion 39 of 30φ diameter microscope.

Rotation of an image pick-up apparatus caused by gravity can be prevented by providing an O-ring on inner periphery side of the second adaptor 16 in this manner, even if the main body 2 is attached in an oblique direction as described above, while the first end 3 of main body 2 is inserted to the second adaptor and the second adaptor is inserted to the ocular inserting portion 30 of 30φ diameter microscope.

As described above, adaptor system of the present invention is adaptable to both specifications of ocular inserting portion that is, 23.2φ diameter microscope and 30φ diameter microscope and by installing these adaptor systems on inserting portion of either size, rotation of the image pick-up apparatuses attached to the second end 6 of the main body 2 and the main body 2 itself can be prevented.

Figure 11:
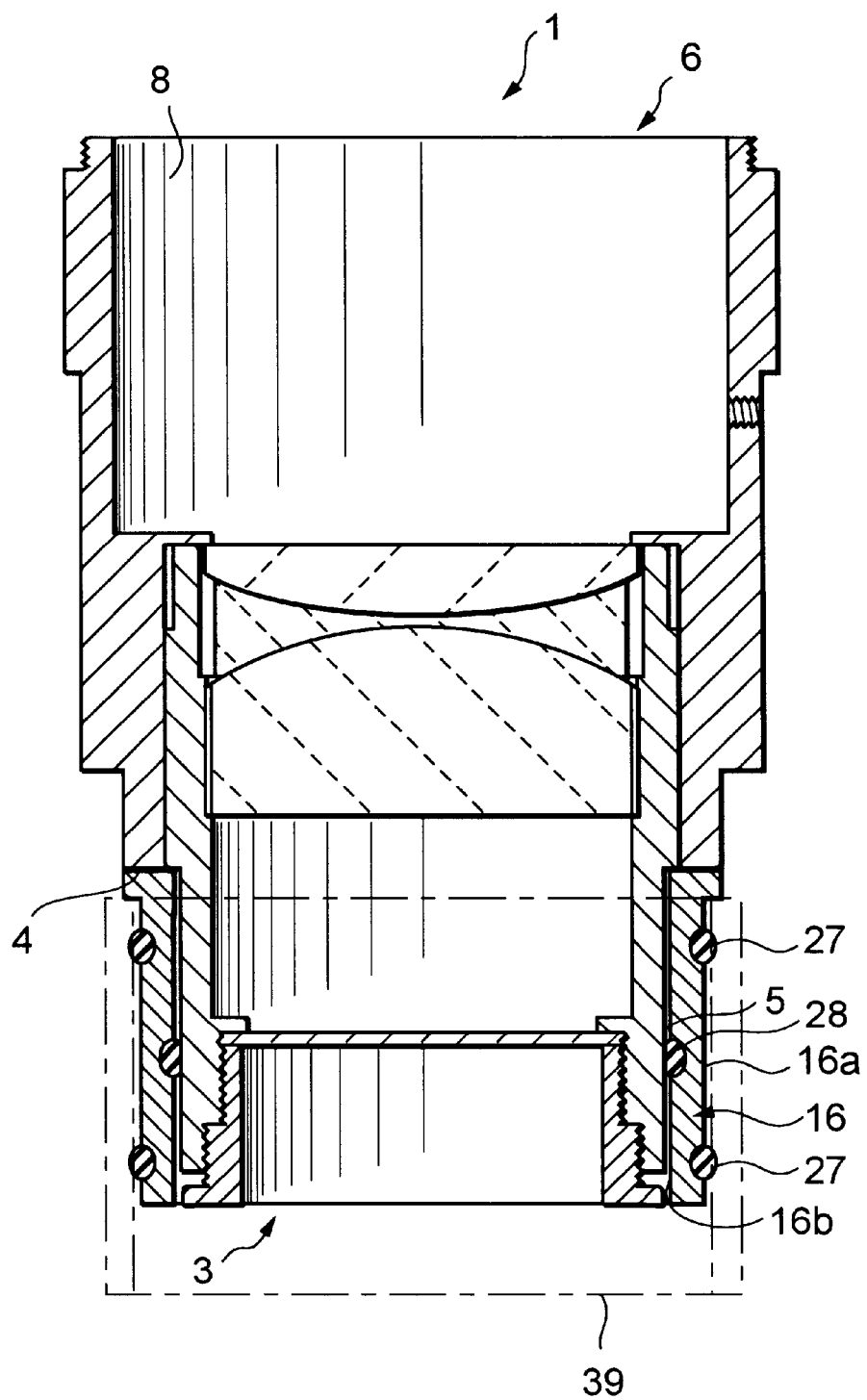
FIG. 11 is a sectional view showing the state when φ30 adaptor shown in FIG. 10 is attached to the optical adapter shown in FIG. 1.

In addition, by using optical adapter 1 in a manner shown in FIG. 1, digital camera and the like can be attached to a microscope having an ocular inserting portion of inside diameter φ23.2, and, as shown in FIG. 11, φ30 adaptor in FIG. 10 is attached to the optical adapter 1 in FIG. 1 and a digital camera can be installed on a microscope having an ocular inserting portion of inside diameter φ30.

Figure 12:
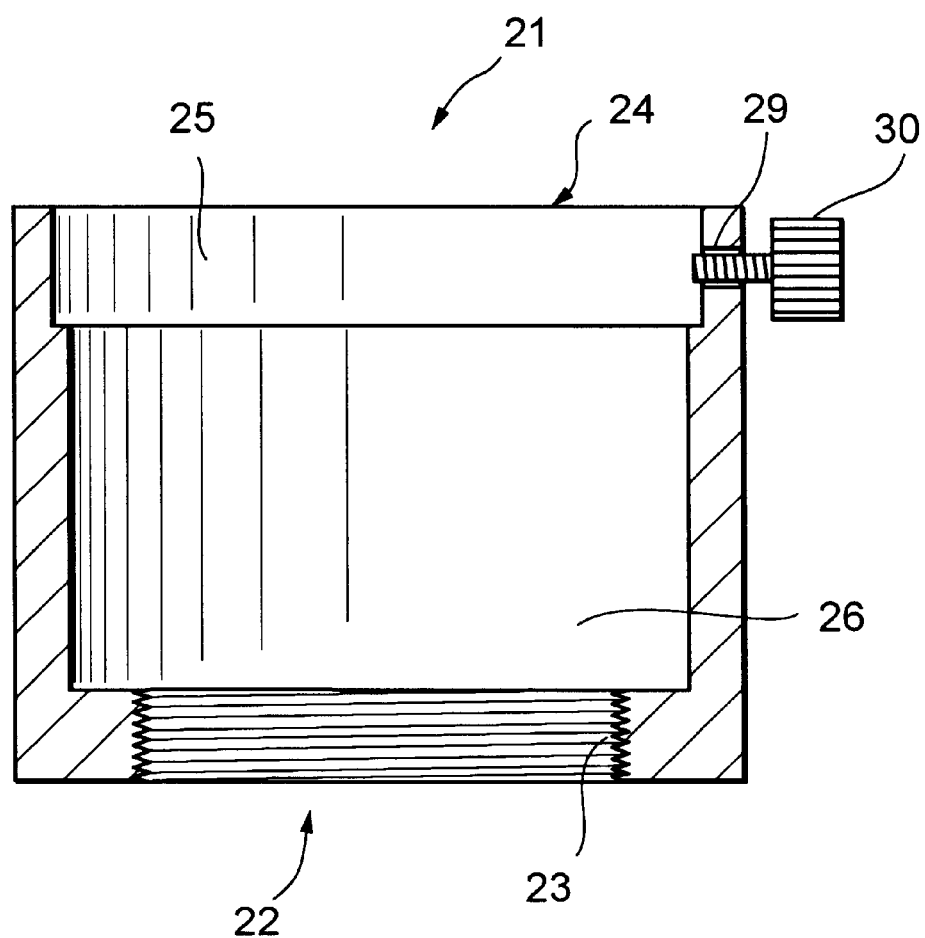
FIG. 12 is a sectional view showing a configuration of a C-mount adapter related to an embodiment other than the present invention.
Figure 13:
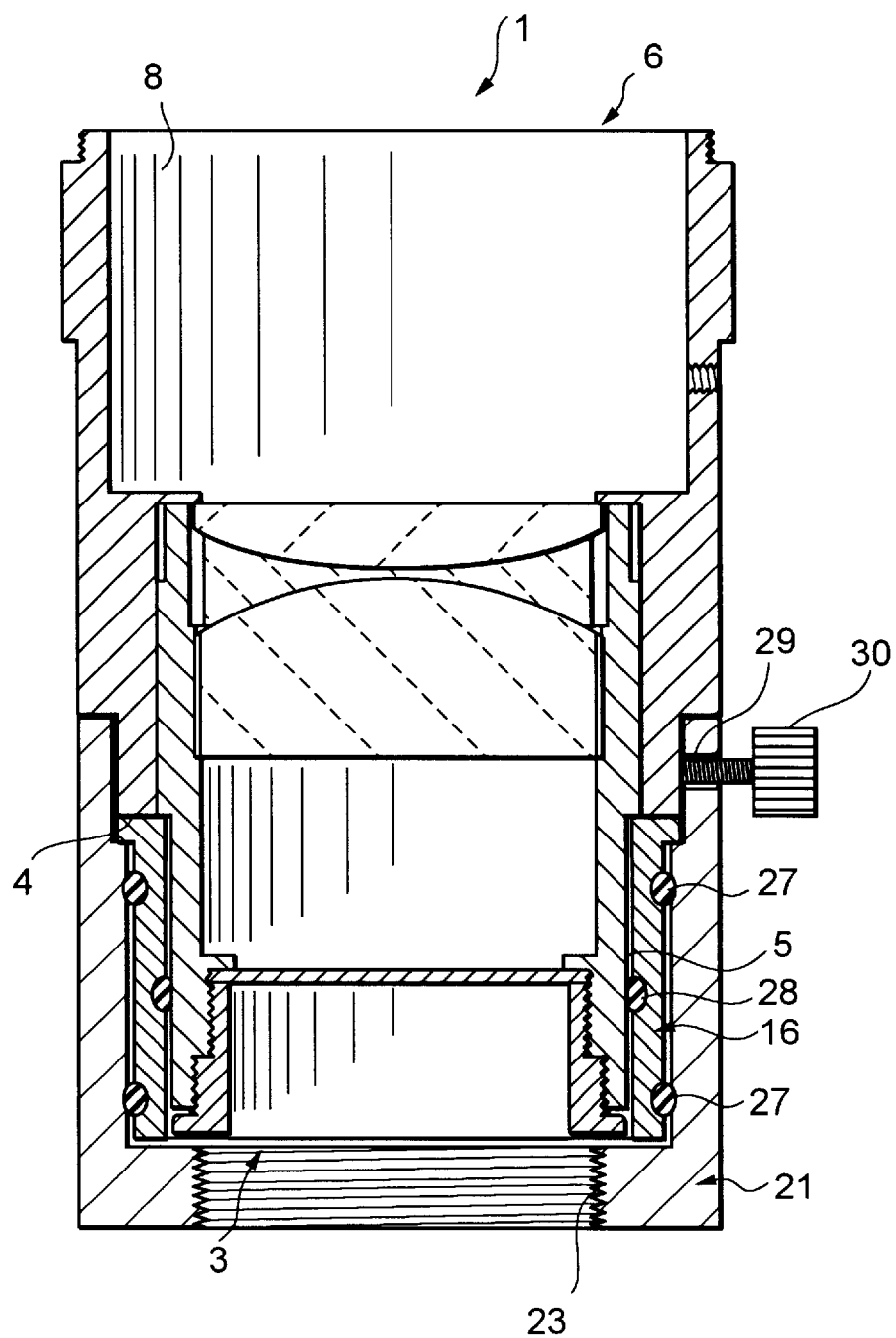
FIG. 13 is a diagram showing the state when φ30 adaptor shown in FIG. 10 and a C-mount adapter shown in FIG. 12 is attached to the optical adapter which is shown in FIG. 1.

FIG. 12 is a diagram showing another embodiment of C-mount adapter 21; a threaded hole 29 is provided to the side of the inserting portion 25 of the second end 24 side and a screw 30 is attached to the main body 2 of optical adapter 1 mentioned above. In other words, optical path 26 (FIG. 12) having an optical path length which allows an image to be formed at the aforesaid specific position of the digital camera and the CCD camera attached to the optical adapter 1 through the C-mount section of the microscope is provided inside the C-mount adapter 21, while the first end 3 of the optical adapter 1 is inserted into the inserting portion 25 of the second end 24 through 30ϕ adaptor 16 as shown in FIG. 13 and locked in a predetermined position. In this manner, by using screw 30, rotation of the main body 2 and the image pick-up apparatus of a digital camera and the like can be prevented while they are attached to the C-mount section of the microscope.

Next, an embodiment of attaching the C mount CCD camera as an image pick-up apparatus on a microscope through a fourth adapter according to the present invention is explained.

Figure 14:
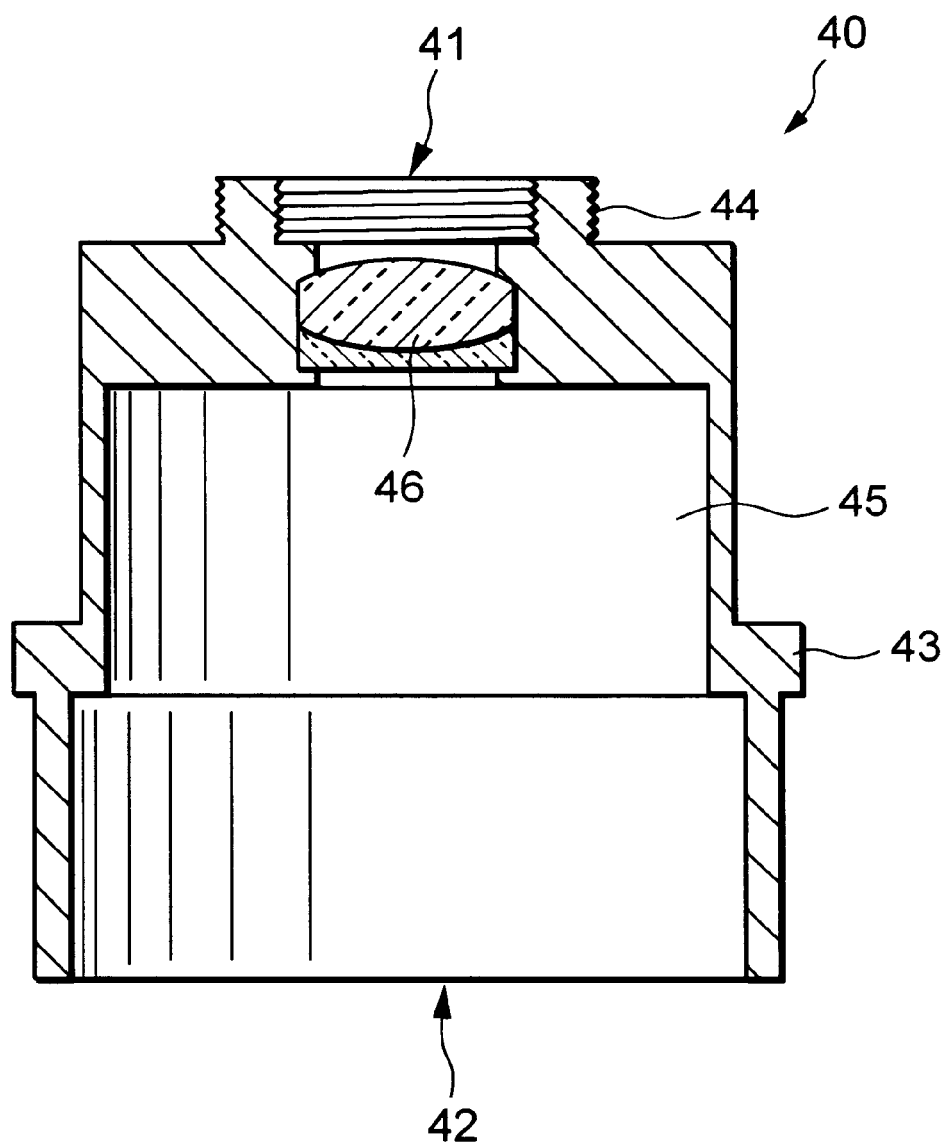
FIG. 14 is a sectional view showing an adapter for a C mount CCD camera according to an embodiment of the present invention.

FIG. 14 is a sectional view showing a fourth adapter according to the present invention.

A fourth adapter 40 has a cylindrical shape, having therein an optical path 45.

Figure 15:
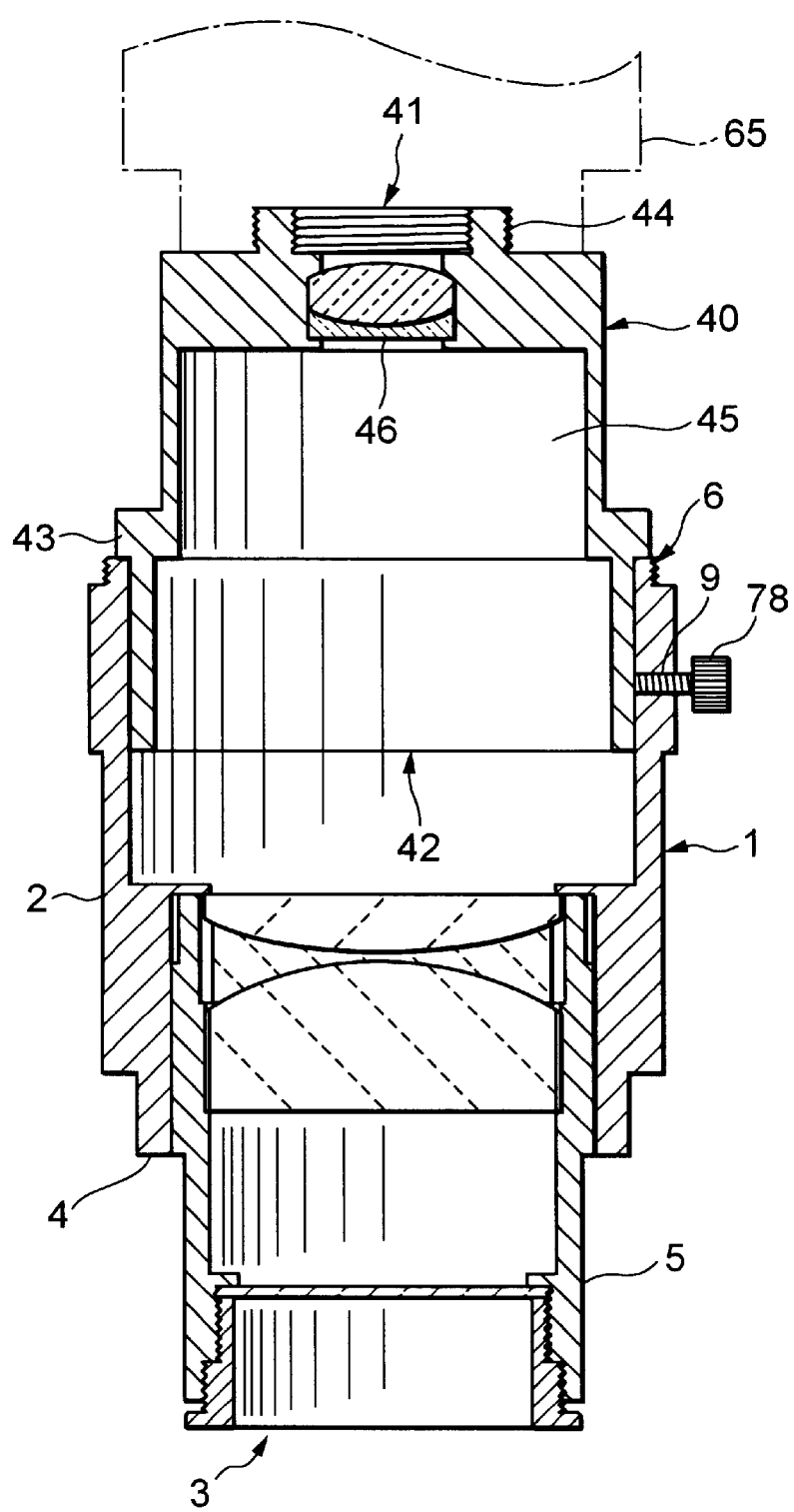
FIG. 15 is a sectional view showing the state when the optical adapter shown in FIG. 14. is attached to the adapter shown in FIG. 1.

As shown in FIG. 15, a first end 42 of the fourth adapter 40 is inserted to the second end 6 of the aforesaid optical adapter 1, and a flange portion 43 having a bigger diameter than a diameter of the second end 6, functions as an engaging portion and the fourth adapter 40 is held engagingly in a predetermined position and is fixed by a screw 78 of the optical adapter 1 to prevent rotation thereof. In addition, a screwing portion having a screw thread 44, is provided to a second end 41 of the fourth adapter 40 so that C mount CCD camera 65 can be attached thereto.

On the optical path 45, the first end 3 of the optical adapter 1 is inserted to an ocular inserting portion of the microscope, and held engagingly in a predetermined position and, a lens system 46 which allows an image to be formed at C mount CCD camera 65 through the ocular inserting portion and the optical adapter 1 of the microscope is disposed, while that the first end 42 is inserted to the second end 6 of optical adapter 1, and locked in a predetermined position.

Figure 16:
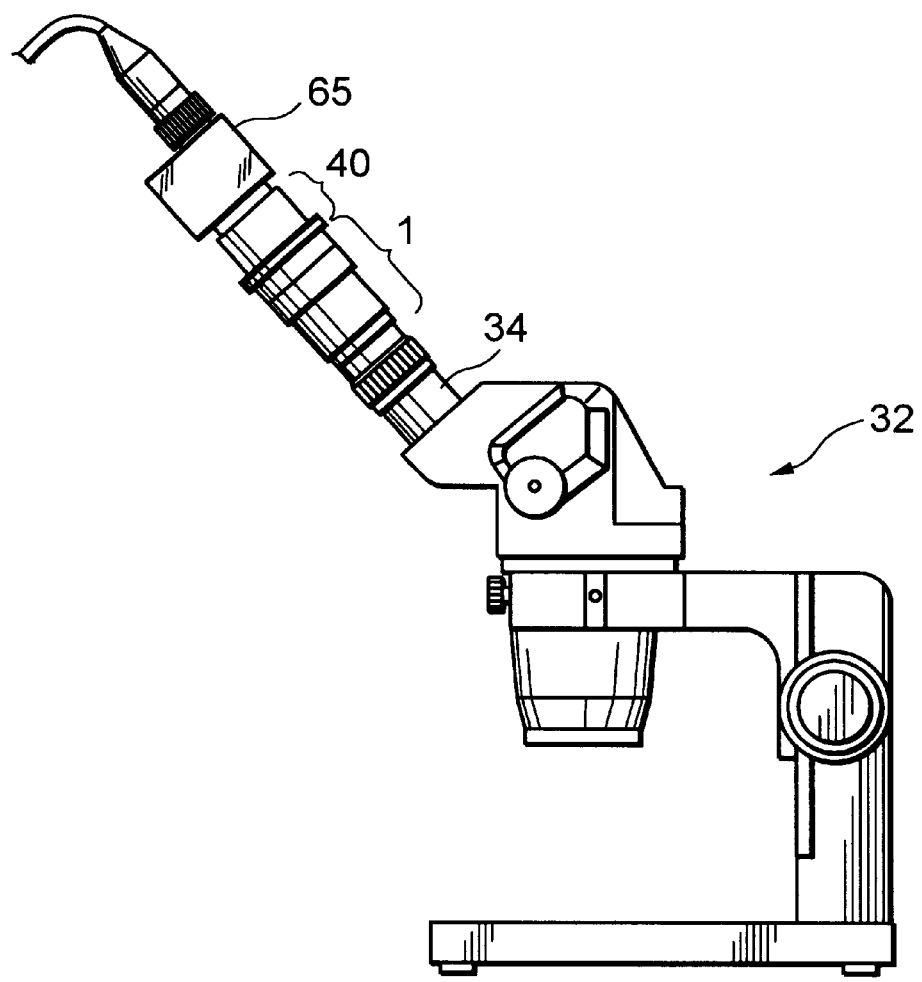
FIG. 16 is a diagram for explaining an example (the third example) of the use of the adapter system according to the embodiment of the present invention.

In other words, as shown in FIG. 16, when an image formed on the microscope is picked up on C mount CCD camera by using the fourth adapter 40, C mount CCD camera 65 is to be attached to the ocular inserting portion 34 of the microscope 32 by using the optical adapter 1 and the fourth adapter 40 of the present invention.

In this manner, a C mount CCD camera can easily be attached to an ocular section of a microscope without a C-mount section by using the fourth adapter 40.

Figure 17:
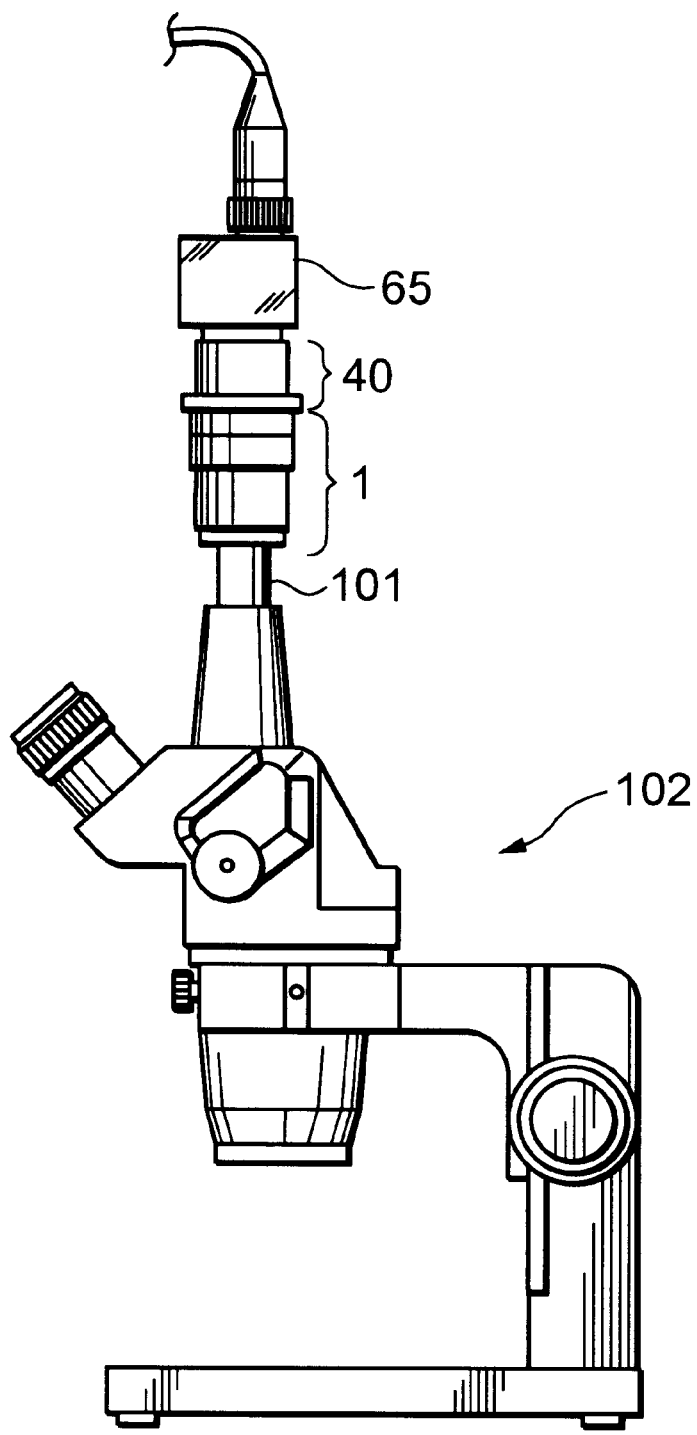
FIG. 17 is a diagram for explaining an example (the fourth example) of the use of the adapter system according to the embodiment of the present invention.

On the other hand, by using the fourth adapter 40, as shown in FIG. 17, the above mentioned C mount CCD camera 65 can also be attached to a cylindrically shaped protruding portion 101, having an optical path with an optical path length which allows an image to be formed at the specified position of the image pick up apparatus attached to the second end 41 of the fourth adapter 40. In that case, the first end 3 of the optical adapter 1 (referred in FIG. 1) is inserted to the protruding portion 101 and held engagingly in a predetermined position.

As explained above, according to the present invention, a magnified image via a microscope can easily be picked up by using an image pick-up apparatus such as a digital camera or the like.

In addition, when having installed an image pickup apparatus of the digital camera and the like in an ocular section of the microscope, the rotation of the various image pick-up apparatuses caused by gravity can be prevented.

The aforesaid embodiments have the intention of clarifying technical meaning of the present invention. Therefore, the present invention is not intended to be limited to the above concrete embodiments and to be interpreted in a narrow sense, and various changes may be made therein without departing from the spirit of the present invention and within the meaning of the claims.

What is claimed is:

1. An adapter system, comprising:
   (a) a first adapter including:
       a main body, a first end of which is inserted into an ocular inserting portion of a microscope and held engagingly in a predetermined position and to a second end of which an image pick-up apparatus is allowed to be attached, having a first optical path therein; and
       a first lens system which is disposed in the first optical path inside the main body and which allows an image through the ocular inserting portion to be formed at a specified position of the image pick-up apparatus attached to the main body while the main body is inserted into the ocular inserting portion of the microscope and held engagingly in said predetermined position; and
   (b) a second adapter, a first end of which is engaged with a C-mount section of the microscope and into a second end of which the first end of said first adapter is inserted and held engagingly in said predetermined position, having therein a second optical path with a second optical path length which allows an image to be formed through the C-mount section of the microscope at the specified position of the image pick-up apparatus attached to said first adapter while the first end of said first adapter is inserted into the second end and held engagingly in said predetermined position; and
   (c) a dimension measuring glass mounting section to and from which a dimension measuring glass is allowed to be attached and detached and provided at a focal position in the first optical path inside the main body of said first adapter.

2. An adapter system, comprising:
   (a) a first adapter including:
       a main body, a first end of which is inserted into an ocular inserting portion of a microscope and held engagingly in a predetermined position and to a second end of which an image pick-up apparatus is allowed to be attached, having a first optical path therein, and
       a first lens system which is disposed in the first optical path inside the main body and which allows an image through the ocular inserting portion to be formed at a specified position of the image pick-up apparatus attached to the main body while the main body is inserted into the ocular inserting portion of the microscope and held engagingly in said predetermined position;
   (b) a second adapter, a first end of which is engaged with a C-mount section of the microscope and into a second end of which the first end of said first adapter is inserted and held engagingly in said predetermined position, having therein a second optical path with a second optical path length which allows an image to be formed through the C-mount section of the microscope at the specified position of the image pick-up apparatus attached to said first adapter while the first end of said first adapter is inserted into the second end and held engagingly in said predetermined position; and (c) a rotation stopping portion for preventing the rotation of said first adapter inserted in the ocular inserting portion provided in at least one part of a contact portion with the ocular inserting portion of the microscope in the main body of said first adapter.

3. The system as set forth in claim 2, wherein the rotation stopping portion is formed by making the surface of at least one part of the contact portion rougher than the surfaces of the other portions.

4. The system as set forth in claim 2, wherein the rotation stopping portion is a tape stuck on at least one part of the contact portion.

5. The system as set forth in claim 2, wherein the rotation stopping portion is a plurality of slots provided in a direction of insertion into the ocular inserting portion.

6. An adapter system, comprising:

(a) a first adapter including:
a main body, a first end of which is inserted into an ocular inserting portion of a microscope and held engagingly in a predetermined position and to a second end of which a digital camera or a CCD camera are allowed to be attached, having a first optical path therein, and
a first lens system which is disposed in the first optical path inside the main body and which allows an image through the ocular inserting portion to be formed at a specified position of the digital camera or the CCD camera attached to the main body while the main body is inserted into the ocular inserting portion of the microscope and held engagingly in said predetermined position;

(b) a second adapter, a first end of which is engaged with a C-mount section of the microscope and into a second end of which the first end of said first adapter is inserted and held engagingly in said predetermined position, having therein a second optical path with a second optical path length which allows an image to be formed through the C-mount section of the microscope at the specified position of the digital camera or the CCD camera attached to said first adapter while the first end of said first adapter is inserted into the second end and held engagingly in said predetermined position;

(c) a screwing portion at which a lens section of the digital camera is screwed down and an insertion portion into which a lens section of the CCD camera is inserted and provided at the second end of the main body; and (d) a threaded hole in which a screw for fixing the CCD camera inserted into the insertion portion is driven and provided in the main body.

7. An adapter system, comprising:

a first adaptor including: a main body, a first end of which is inserted into a first ocular inserting portion of a first inside diameter of a microscope and held engagingly in a predetermined position, and to a second end of which an image pick-up apparatus is allowed to be attached, having a optical path therein; and a lens system which is disposed in the first optical path inside the main body and which allows an image through the first ocular inserting portion to be formed at a specified position of the image pick-up apparatus attached to the main body, while the main body is inserted to the first ocular inserting portion of the microscope, and held engagingly in a predetermined position; and (b) a second adaptor, the first end of the main body is inserted to and held engagingly in a predetermined position and further inserted to the second ocular inserting portion of a microscope having the second inside diameter bigger than the first thereof, and held engagingly in a predetermined position; and (c) a rotation stopping portion, provided on a contact portion of the first adaptor and the second adaptor which prevents rotation of the main body, while first end of the main body is inserted to the second adaptor, and the second adaptor is inserted to a second ocular inserting portion.

8. The system as set forth in claim 7, wherein the rotation stopping portion has a first O-ring provided at an inner periphery of the said second adaptor.

9. The system as set forth in claim 7, wherein the first ocular inserting portion having the first inside diameter of said microscope is an ocular inserting portion with a diameter of 23.2φ established by Japanese Industrial Standard and the second ocular inserting portion having the second inside diameter is an ocular inserting portion with a diameter of 30φ established by Japanese Industrial Standard.

10. The system as set forth in claim 7, further comprising:

a third adaptor, a first end of which is engaged with a C-mount section of the microscope, and a second end of which the second adapter is inserted and held engagingly in a predetermined position, having therein an optical path with an optical path length and allows an image to be formed through the C-mount section of the microscope at the specified location of the image pick-up apparatus attached to the main body, a second O-ring which is provided at an outer periphery of the second adaptor and prevents rotation of the main body, while the first end of said main body is inserted into the second adaptor which is further inserted into the third adaptor, and the third adaptor is engaged with C-mount section of the microscope.

11. The system as set forth in claim 10, further comprising:

a threaded hole in which a screw preventing rotation of the main body is driven, and provided to the third adapter, while the first end of said main body is inserted to the second adaptor, which is inserted to the third adaptor, and the third adaptor being engaged with C-mount section of the microscope.

12. An adapter system, comprising:

(a) a first adapter including:
a main body, a first end of which is inserted into an ocular inserting portion of a microscope and held engagingly in a predetermined position and to a second end of which a CCD camera is allowed to be attached, having a first optical path therein, and a first lens system which is disposed in the first optical path inside the main body and which allows an image through the ocular inserting portion to be formed at a specified position of the CCD camera attached to the main body while the main body is inserted into the ocular inserting portion of the microscope and held engagingly in said predetermined position; and (b) a second adapter, a first end of which is engaged with a C-mount section of the microscope and into a second end of which the first end of said first adapter is inserted and held engagingly in said predetermined position, having therein a second optical path with a second optical path length which allows an image to be formed through the C-mount section of the microscope at the specified position of the CCD camera attached to said first adapter while the first end of said first adapter is inserted into the second end and held engagingly in said predetermined position: and (c) a third adapter, having a first end and a second end, the first end being inserted to the second end of the main body, and a third lens system being disposed in a third optical path therein, the third adapter being held engagingly in a predetermined position when the first end thereof is inserted to the first end of the main body and the third lens system allows an image to be formed at a specified position of the CCD camera through the ocular inserting portion and the first adapter of the microscope when the first end of the third adapter is inserted to the first end of the main body and held engagingly in the predetermined position, in the same time, the first end of the main body is inserted to the ocular inserting portion of the microscope and held engagingly in the predetermined position.

* * * * *